Dec. 9, 1969  L. E. PRESCOTT  3,482,499
ROTATABLE IMAGE CAMERA UTILIZING AXIALLY ALIGNED
IMAGE-ROTATING PRISM
Filed Nov. 20, 1967  2 Sheets-Sheet 1

Inventor:
Leonard E. Prescott,
by *John F. Ahern*
His Attorney.

Dec. 9, 1969  L. E. PRESCOTT  3,482,499
ROTATABLE IMAGE CAMERA UTILIZING AXIALLY ALIGNED
IMAGE-ROTATING PRISM
Filed Nov. 20, 1967  2 Sheets-Sheet 2
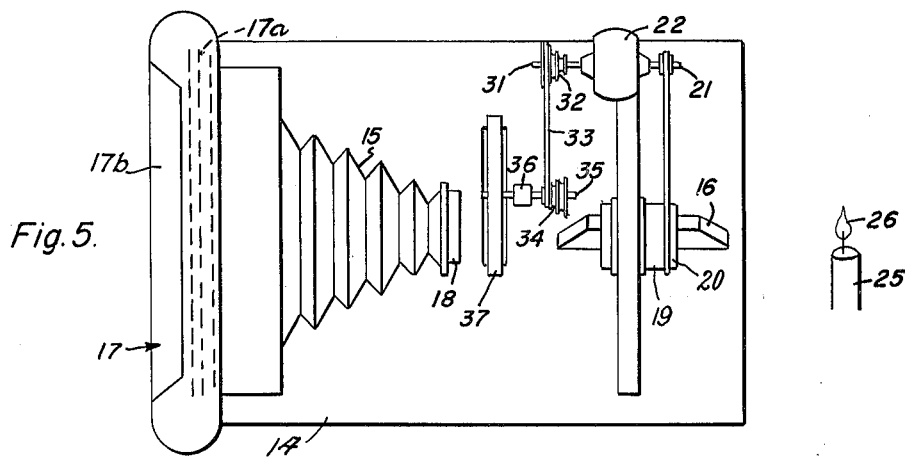
Fig. 5.
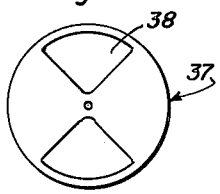
Fig. 6.
Fig 4.
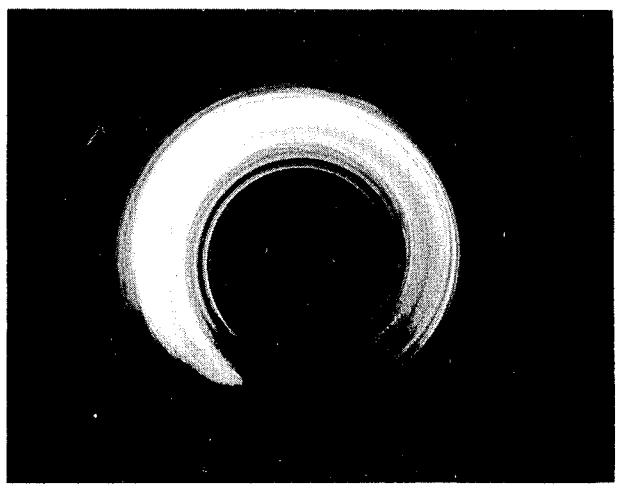
Inventor
Leonard E. Prescott,
by  *John F. Ahern*
His Attorney.

United States Patent Office 3,482,499
Patented Dec. 9, 1969

3,482,499
ROTATABLE IMAGE CAMERA UTILIZING AXIALLY ALIGNED IMAGE-ROTATING PRISM
Leonard E. Prescott, Waterford, N.Y., assignor to General Electric Company, a corporation of New York
Continuation-in-part of application Ser. No. 590,233, Oct. 28, 1966. This application Nov. 20, 1967, Ser. No. 684,411
Int. Cl. G03b *19/06*
U.S. Cl. 95—36         8 Claims

ABSTRACT OF THE DISCLOSURE

A rotatable image camera adapted to record continuous streak type photographs of a continuous event or to record a plurality of discrete images of the continuing event, both as a function of time, includes a reflex camera and a rotatable dove prism aligned with the camera lens. As the prism rotates, the image being photographed rotates about a predetermined axis and is recorded as a single streaked image or, using a rotating slotted disc, as a plurality of discrete images.

---

Figure 1:
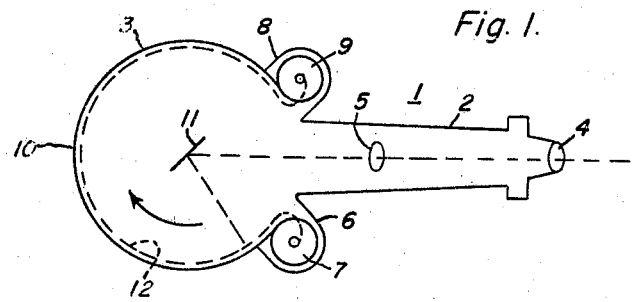

The present invention is a continuation-in-part of my copending application, Ser. No. 590,233, filed Oct. 28, 1966, and assigned to the present assignee, and relates to photographic apparatus specifically adapted to the recording of continuing incidents as a function of time in the field generally referred to as chronography and with such devices generally referred to as chronographs. More particularly, the present invention relates to a rotatable image camera or chronograph.

For the study of certain phenomena, particularly, self-illuminating phenomena, such as gaseous and vacuum arcs, lightning phenomena, explosions, and other light-producing incidents, which are often studied as a function of time, it is desirable that photographic records of the phenomena be produced which records indicate the intensity, the color, the shape, and other characteristics of the phenomena being studied or reported over a period of time. Such records may very often include the full duration of the phenomena. Thus, for example, whereas a circuit-interrupting arc, which may last for only several microseconds or milliseconds, may be recorded upon a conventional camera with conventional photographic techniques as a single flash of light between a pair of electrodes, it is desirable that the arc be shown and recorded as it exists from incidence to extinction.

For the purpose of such photographs, the chronograph has been developed and generally records, along a strip of film in a particularly adapted camera, a series of images representing the phenomena being photographed for a given period of time as a function of time. Such apparatus is, however, exceedingly complicated and expensive and present a number of problems which makes their use in the laboratory and in the field difficult and often impracticable.

Accordingly, it is an object of the present invention to provide a chronograph which is simple in construction and easy to operate.

A further object of the present invention is to provide a simple chronograph which provides a photographic image of a transient light-producing phenomenon as a function of time with high resolution and accuracy, Yet another object of the present invention is to provide a chronograph which is adapted to provide instantaneous images as a function of time on a light-producing phenomenon being recorded, Still another object of the present invention is to provide camera apparatus adapted to provide a plurality of discrete images of a time-dependent phenomenon on a single photographic plate.

In accord with the present invention, I provide a rotatable image camera or chronograph having simple construction and which is readily and quickly operated to provide time study photographs of light-generating phenonenon such as arcs, sparks, lightning, and other similar phenomena by providing a reflex or equivalent camera with an associated photographic film system and cause the image which is to be recorded to be focused upon the film through the lens of the reflex camera and through a circular arc upon the camera film. The image may be recorded continuously to provide a circular streak image or may be interrupted to record a plurality of discrete images.

In accord with another feature of the invention, I utilize an instant developing camera film so that the picture may be observed within a matter of seconds, thus making determination as to whether the test recorded need be repeated for further photographic recording.

Figure 2:
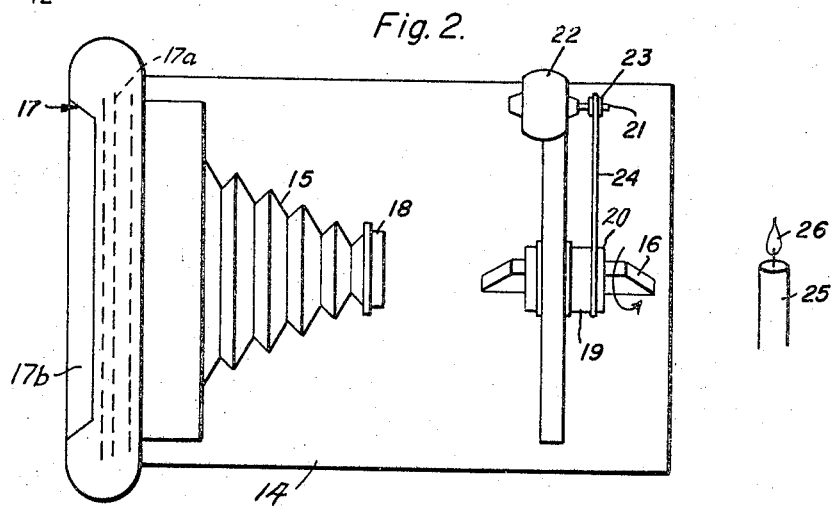
Figure 3:
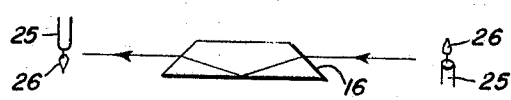
Figure 7:
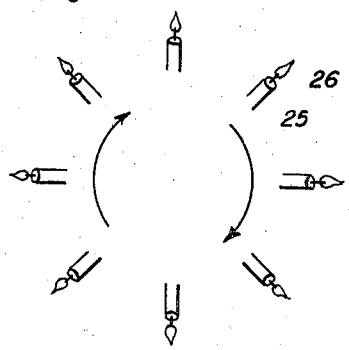

The novel features believed characteristic of the present invention are set forth in the appended claims. The invention itself, together with further objects and advantages thereof, may best be understood with reference to the following detailed description taken in connection with the appended drawing in which:

FIGURE 1 represents a conventional streak camera,

FIGURE 2 is a schematic view of a rotatable-image camera adapted to record streak images in accord with the present invention, FIGURE 3 is a schematic representation of the path of light through the prism of the device of FIGURE 2, FIGURE 4 is a simplified representation of a picture which may be obtained using the streak camera illustrated in FIGURE 2 of the drawing, FIGURE 5 is a schematic representation of an alternative embodiment of the present invention, FIGURE 6 is a side view of a sector disc utilized in accord with the embodiment of FIGURE 5, and FIGURE 7 is a schematic representation of a series of discrete images taken by the device of FIGURE 5.

In FIGURE 1 of the drawing, a conventional streak camera or chronograph, typical of those of the prior art, is illustrated schematically. The entire camera includes a casing 1 including a camera portion 2 and a magazine portion 3. Camera portion 2 includes a pair of lenses 4 and 5 at least one of which is necessary, but which may both be utilized if an uninverted image is desired. Magazine portion 3 includes an unexposed film magazine 6 containing a first unexposed film spool 7 and an exposed film magazine 8 including a second exposed film spool 9. Magazine portion 3 also includes a large circular film track 10 and a rotating mirror 11 located at the center thereof. A linear film 12 is loaded into magazine 6 upon spool 7 and is threaded around film track 10 and taken up upon spool 9 on magazine 8. As a light-producing phenomenon which is to be photographed is occurring, mirror 11 is rotated at a preselected rotation speed and the image of sequential operations is projected upon differing portions of film 12 within magazine 3 until a full rotation of mirror 11 has been completed.

While such devices are satisfactory for operation under many conditions, they are rather expensive in that the entire casting, including camera and magazine containers, must be impervious to light. The film loading process is tedious and time consuming, making it difficult to take sequential pictures in rapid sequence. Additionally, it is impossible, without dissembling the magazine and removing the film therefrom, to examine a first picture before a second picture is taken so that the parameters governing the light generating phenomenon being photographed may be modified in accord with a first photograph in order to obtain better information therefrom in a second or subsequent photograph.

In accord with the present invention, I overcame the objections to the devices similar to that of FIGURE 1. In FIGURE 2 of the drawing, I have illustrated schematically a rotatable image camera or chronograph in accord with the present invention. In FIGURE 2 a conventional reflex camera 15 is mounted upon a rigid mounting plate 14 and is equipped with a film packet 17 which may preferably contain an instantaneous development film 17a which may, for example, comprise a rupturable developing pod self-stabilizing film adapted for instantaneous development as, for example, Polaroid Type 3000 film. Alternatively, film packet 17 may be adapted to contain a series of plates which may be removed, after opening access door 17b, and instantly processed in a very rapid period of time by conventional means. A dove (truncated right regular) optical prism 16 is located along the axis of the lens of camera 15 and is mounted rigidly within a prism cartridge 19 containing a pulley reel 20. Prism cartridge 19 is connected to the shaft 21 of an adjustable speed motor 22 upon which is mounted a second pulley 23 which is connected to the pulley 20 upon cartridge 19 by a drive belt 24. Activation of the controllable speed motor 22 causes rotation of pulleys 23 and 20 and rotation of prism 16 at a preselected speed. An object to be photographed, which in most instances will be a light-producing, short-duration phenomenon, such as a gaseous or vacuum arc, or spark, or a portion of a lightning flash, or other such discharge, is represented generally by candle 25 and is slightly displaced from the logitudinal axis of prism 16 and lens 18 of camera 15. The longitudinal axis of the prism is co-linear with this axis and the angles of the faces of the prism are such that light rays are deflected upon entry and exit from the prism and totally internally reflected from an inner surface therewithin, so that the rays are slightly deflected by the prism and inverted. A typical path of light rays through the prism is shown in FIGURE 3. Upon the occurrence of the phenomenon to be photographed, the rotating prism causes the time-dependent characteristics and the ever-changing image of the phenomenon to be spread out over the surface of the film exposed through lens 18 so that the circular axis, if spread out would produce the same type of image as would be produced linearly across the roll of film 12 in the camera of FIGURE 1.

In FIGURE 4 of the drawing there is illustrated schematically a photograph which would be obtained by operation of the device illustrated in FIGURE 2 to photograph the intensity of the emission of a photolamp flash located in place of candle 25 at a preselected speed. An infinite number of images are recorded of the time dependent fluctuations of the flash bulb. These images are combined to form the diminishing image shown as a streak on the plate of the film within cartridge 17, as for example, as illustrated in FIGURE 4. The opening of the shutter of camera and the occurrance of the photographed phenomenon are, of course, synchronized, as is well known in the art.

If the instantaneous development pod, as for example, that utilized in the Polaroid 3000 film, is utilized the film may be removed and within a number of seconds, less than a minute, the film may be observed. Thus, if it is necessary to adjust the apparatus producing the time-dependent light-producing phenomenon in order to better observe the characteristics thereof, these adjustments may be made rapidly and subsequent pictures taken in very rapid sequence in order to gain a desirable photographic record of the phenomenon being studied. Alternatively, if the phenomenon being studied is a natural phenomenon, as for example, lighting over which no control is possible, the rapid and near-instantaneous development of films of this type makes it possible to make adjustments to the lens system of the camera or even to change film from one photographic speed to another in order to optimize the photographic record of the events being taken without the necessity of dissembling and assembling a complicated mechanism, such as that illustrated in FIGURE 1, and reloading after development and observation of the film was taken.

In accord with another embodiment of the invention, if a rapidly-developable conventional film plate is utilized instead of the Polaroid-type instant developing film, the same advantages of not having to assemble the apparatus and load and reload with a different film upon the unexposed and exposed film spools nevertheless achieves great advantage in simplicity and speed over conventional streak cameras, even though the development of the film may take a matter of a few minutes before a change in film or adjustment of the camera or of the parameters being studied may be made.

Since the dove prism is asymmetrical, and its rotation at high speeds can cause some unbalance problems, this must be taken into consideration. The counter-balancing for the asymmetry of the dove prism is not a difficult matter and it is well within the skill of an ordinary mechanic. Using conventional balancing techniques, it has been relatively simple to photograph 8 millisecond durations arcs utilizing a speed or revolution of the prism of 3600 r.p.m. with only simple balancing techniques utilized. In one device constructed in accord with the present invention, a Crown Graphic press camera equipped with a Polaroid cartridge utilizing Polaroid 3000 film was utilized. The size of the film was 3¼" by 4¼" per exposure producing a radius vector of the image orbit of slightly less than 3 centimeters. The total length of the orbit traversed in one revolution about this vector is approximately 15 centimeters. The time resolution ($\tau$) for an 8 millisecond duration sweep is determined by the equation $$\tau = d/V$$

$\tau$ is time revolution;
$d$ is the smallest distance of the streak photograph from which useful information can be obtained; and
$V$ = the image velocity over the film.

In the apparatus utilized, useful image information could be read down to 0.25 millimeter. A simple computation utilizing a prism velocity of 60 r.p.s. and an image velocity of 120 r.p.s., producing an image velocity over the film of 1800 centimeters per second yields a time resolution of approximately 14 microseconds. Much higher velocities than this can be achieved with corresponding increases in time resolutions and, at present, the limit in tie resolution has not been reached or determined. Thus, for example, using a Polaroid type 55 P/N having a sheet size of 4" x 5" an image orbit of 25 centimeters is obtained and a resulting image velocity of 3000 centimeters per second results, yielding a time resolution of 8.3 microseconds. The dove prism utilized in the apparatus described above was obtained from Edmunds Scientific Company, Barrington, N.J., and is identified as Catalog No. 40605. Utilizing the device described above, useful photographs of plasma jets vacuum switch arc interruptions and similar phenomenon have been taken. The use of color film as an additional parameter to the study of the arc of light-producing phenomenon, the invention may be practiced utilizing conventional and readily obtainable parts, which are not difficult to assemble or operate and which may be operated sequentially in rapid order to produce an extremely useful tool for chronography.

An alternative embodiment of the invention, adapted to record a plurality of discrete images, rather than a streak photograph, is illustrated in FIGURE 5. In FIGURE 5, like numerals are used to identify like parts to parts of the device of FIGURE 2. The camera 15 of FIGURE 5 is identical to the camera of FIGURE 1 as is the prism 16 and the mechanism for rotating it. Motor 22, in addition to shaft 21, has another shaft, or shaft extension 31 upon which a plurality of pulleys 32 are mounted. Pulleys 32 are connected by belt 33 to a second set of pulleys 34 upon shaft 35 which is held in bushing 36 and carries sector disc 37 thereon. Although sector disc 37 is shown driven from the same motor as prism 16, separate drive means may be provided.

Sector disc 37, illustrated in elevation view in FIGURE 6, has at least one, and may have more open sectors 38 through which images of the photographed object may pass to impinge upon lens 18 of camera 15. The appropriate speed of rotation of sector disc 37 is selected to "stop" discrete images upon the camera film. Other means of "stopping" the images may, of course, be utilized. Synchronization is therefore necessary between the object photographed, the prism rotation, the lens aperture and sector disc. Such synchronization may readily be achieved according to well-known criteria. Although the sector disc is shown located between the prism and camera, it may be to advantage to locate the prism next to the lens with the sector disc between object and prism.

A typical set of discrete images obtained in accord with this embodiment of the invention are illustrated in schematic form in FIGURE 7, which is a diagrammatic representation of a photographic plate similar to that of FIGURE 4, but using slotted disc 37 to "stop" the images.

In further accord with the invention, objects which do not emit their own light may be photographed utilizing a stroboscopic light to periodically illuminate the object. If such a light source is used, sectored disc 37 may be eliminated if the repetition rate of the light is appropriate to record discrete images spaced around the photographic light. Thus, the repetition rate of the light should be N times the revolution rate (in the same units) of the prism to produce N discrete images.

While the invention has been set forth herein with respect to particular embodiments thereof, it is readily apparent that many modifications and changes will occur to those skilled in the art. Accordingly, I intend by the appended claims to cover all such modifications and changes as fall within the true spirit and scope of this invention.

What I claim as new and desire to secure by Letters Patent of the United States is:

1. A chronograph for producing a continuous image of a phenomenon occurring over a period of time and comprising:
   (a) a camera mounted upon a fixed mounting and including a lens and a film magazine,
      (a₁) said magazine being adapted to allow the removal of a single exposed film plate without disassembly of the camera;
   (b) a dove prism juxtaposed along the axis of said lens and in close juxtaposition there to permit focusing an image upon said film through said prism and said lens; and
   (c) means for rotating said prism at a predetermined speed simultaneously with a time dependent phenomenon to be photographed, said phenomenon being displaced from said lens axis to produce a circular image of said single phenomenon as a function of time upon said film plate.

2. The chronograph of claim 1 wherein the film magazine contains a roll of onstant development, self-stabilizing film including rupturable developing pod and a series of pictures may be taken without changing the magazine or changing photographic plates.

3. The chronograph of claim 1 where the prism is a dove prism mounted in a rotatable chamber and pulley driven by means mounted upon said fixed mounting.

4. The chronograph of claim 1 wherein light is supplied to illuminate the time dependent phenomenon by the phenomenon's natural light-producing characteristics.

5. The chronograph of claim 1 wherein light is externally supplied to illuminate the time-dependent phenomenon and is synchronized with the rotating prism and the camera so as to illuminate the phenomenon only when it occurs and the prism is in position to refract an image thereof upon said film.

6. The chronograph of claim 5 wherein said externally supplied light is pulsed at a rate of N times the revolution rate of the prism to produce N discrete images upon said photographic place in circular juxtaposition to one another.

7. The chronograph of claim 1 wherein means are interposed between said object being photographed and said camera and is operative to periodically interrupt the optical path therebetween at a rate sufficient to cause discrete images of said object to be reproduced about a common radius upon said film.

8. The chronograph of claim 7 wherein said open portion being sufficient to pass images of said object to said camera.

References Cited

UNITED STATES PATENTS

| | | | |
|---|---|---|---|
| 2,724,310 | 11/1955 | Paine | 95—13 |
| 2,822,721 | 2/1958 | Parker | 352—84 |
| 2,966,096 | 12/1960 | D'Incerti | 352—69 |
| 3,200,410 | 8/1965 | Frungel | 352—84 |
| 3,366,439 | 1/1968 | Buck | 352—84 |

JOHN M. HORAN, Primary Examiner